United States Patent [19]
Hughes

[11] Patent Number: 5,531,503
[45] Date of Patent: Jul. 2, 1996

[54] VEHICLE SEAT TRACK ASSEMBLY

[75] Inventor: Daniel Hughes, King City, Canada

[73] Assignee: Bertrand Faure Ltd., Mississauga, Canada

[21] Appl. No.: 210,759

[22] Filed: Mar. 22, 1994

[30] Foreign Application Priority Data

Jun. 4, 1993 [CA] Canada .................................. 2097776

[51] Int. Cl.⁶ .................................................. B60N 2/02
[52] U.S. Cl. .................... 297/341; 297/378.1; 297/463.1
[58] Field of Search ..................................... 297/340, 341, 297/463.1, 378.1, 378.12; 248/429, 430

[56] References Cited

U.S. PATENT DOCUMENTS

| | | | |
|---|---|---|---|
| 3,940,182 | 2/1976 | Tamura | 297/341 |
| 4,101,169 | 2/1978 | Muraishi et al. | 297/341 |
| 4,621,867 | 11/1986 | Perring et al. | 297/341 |
| 4,648,657 | 3/1987 | Cox et al. | 297/341 |
| 4,666,208 | 5/1987 | Tatematsu et al. | 297/341 |
| 4,742,983 | 5/1988 | Nihei | 297/341 |
| 4,852,846 | 8/1989 | Weir | 297/341 |
| 4,881,774 | 11/1989 | Bradley et al. | 248/430 X |
| 5,352,019 | 10/1994 | Bauer et al. | 297/341 |

*Primary Examiner*—Milton Nelson, Jr.
*Attorney, Agent, or Firm*—Patrick J. Hofbauer

[57] ABSTRACT

An actuating device has an arm which controls the movement of a track locking mechanism for use in conjunction with a vehicle seat assembly adapted for installation in a vehicle. The seat assembly has a first track member, fixed to the vehicle, and a second track member, secured to the vehicle seat, which track members can be locked in position with respect to one another. A cable is attached to a vehicle seatback, and when the seatback is moved from an upright position to a forwardly folded position, the cable moves the arm of the actuating device from a rest position to a cocked position. When the vehicle seat is moved forward to allow access to the rear seat area of the vehicle, the arm of the actuating device correspondingly moves a cam follower from a raised position to a lowered position. The cam follower restrainingly engages the arm in the cocked position against the biasing of a spring member. When the seat is returned to an occupancy position and the seatback to its upright position, the cam follower contacts a cam that is located at a set position. Upon such contact, the cam follower is moved from its lowered position to its raised position, thus releasing the arm to its rest position. The track locking mechanism is correspondingly allowed to return to its locking configuration, thus locking the vehicle seat in place at this set position.

13 Claims, 8 Drawing Sheets

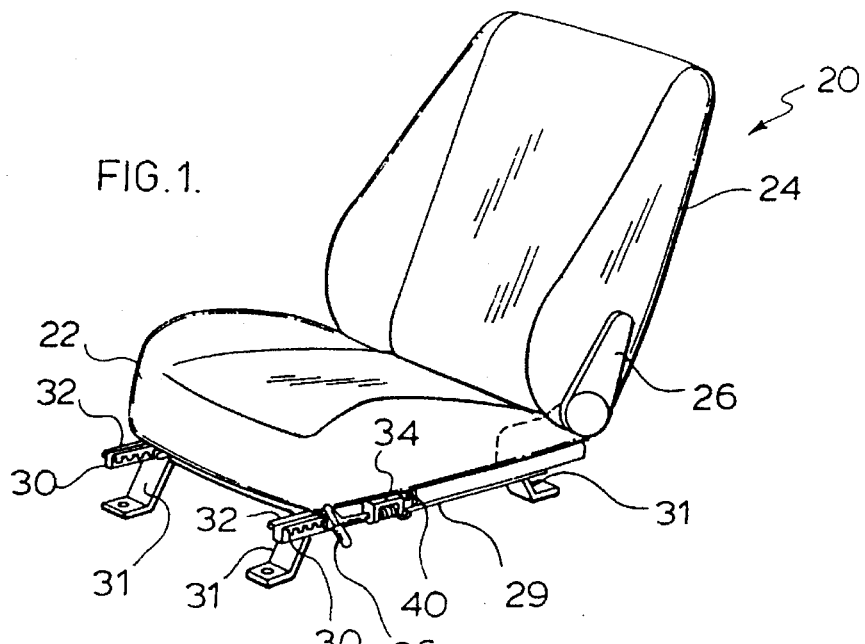
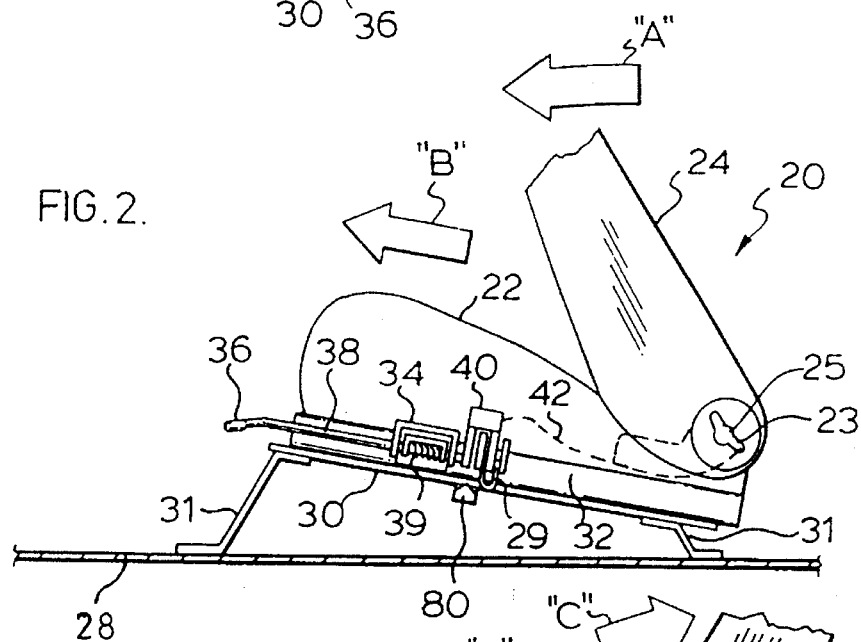
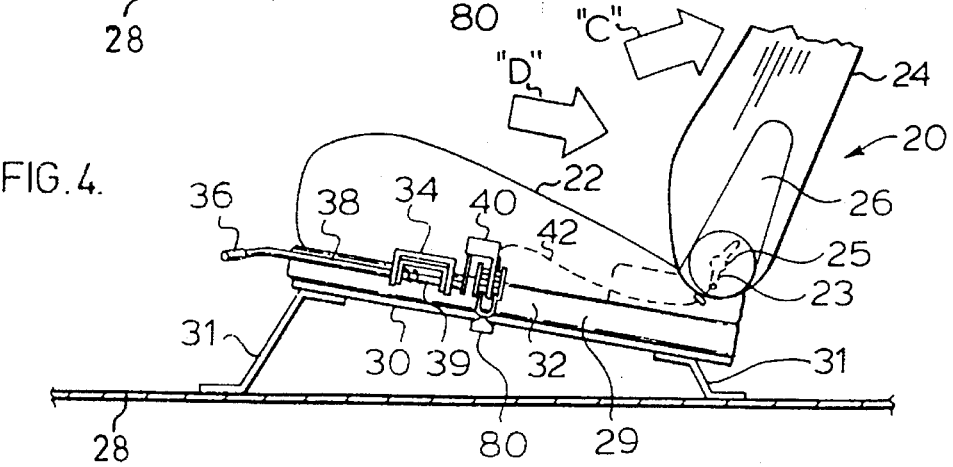

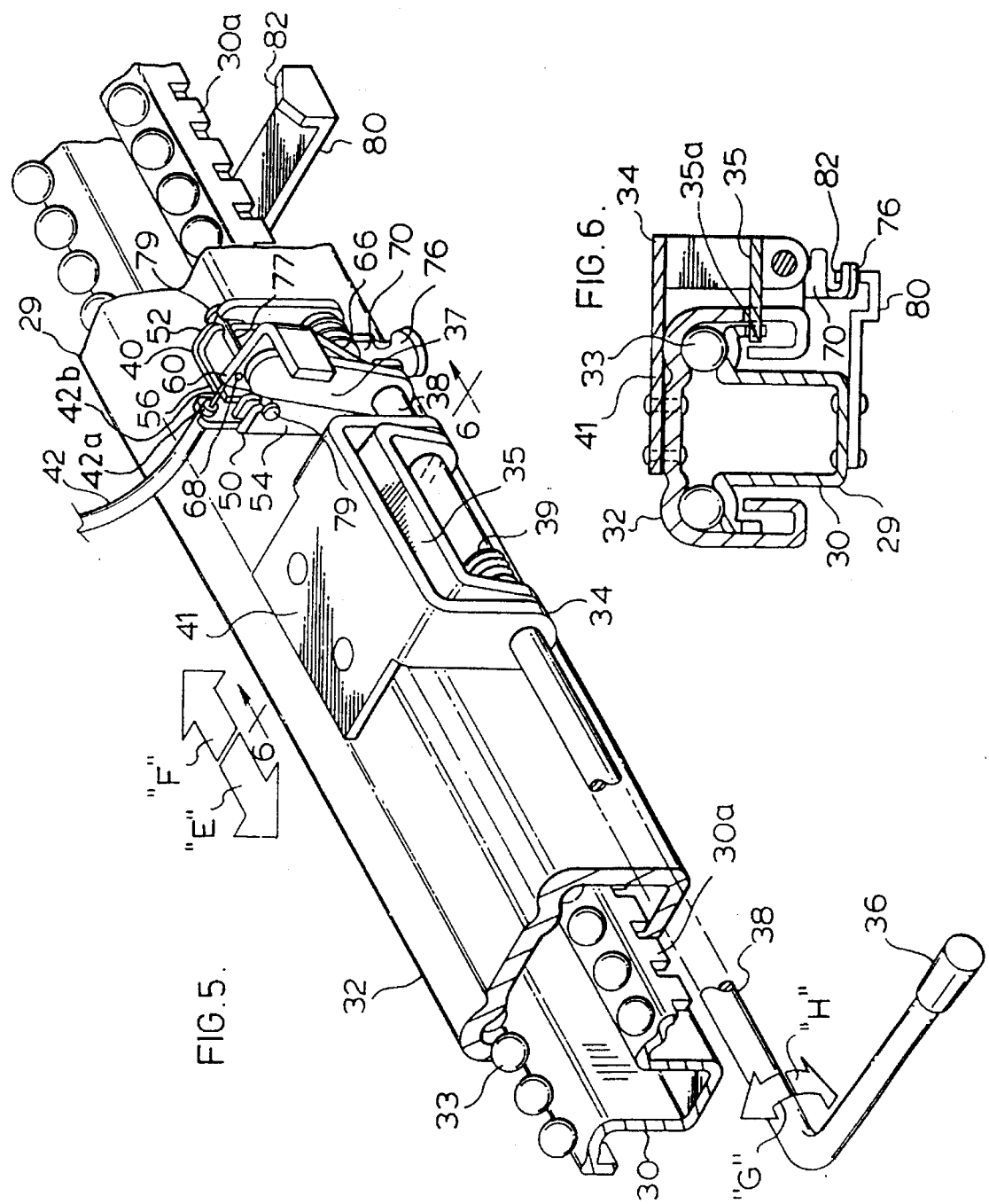

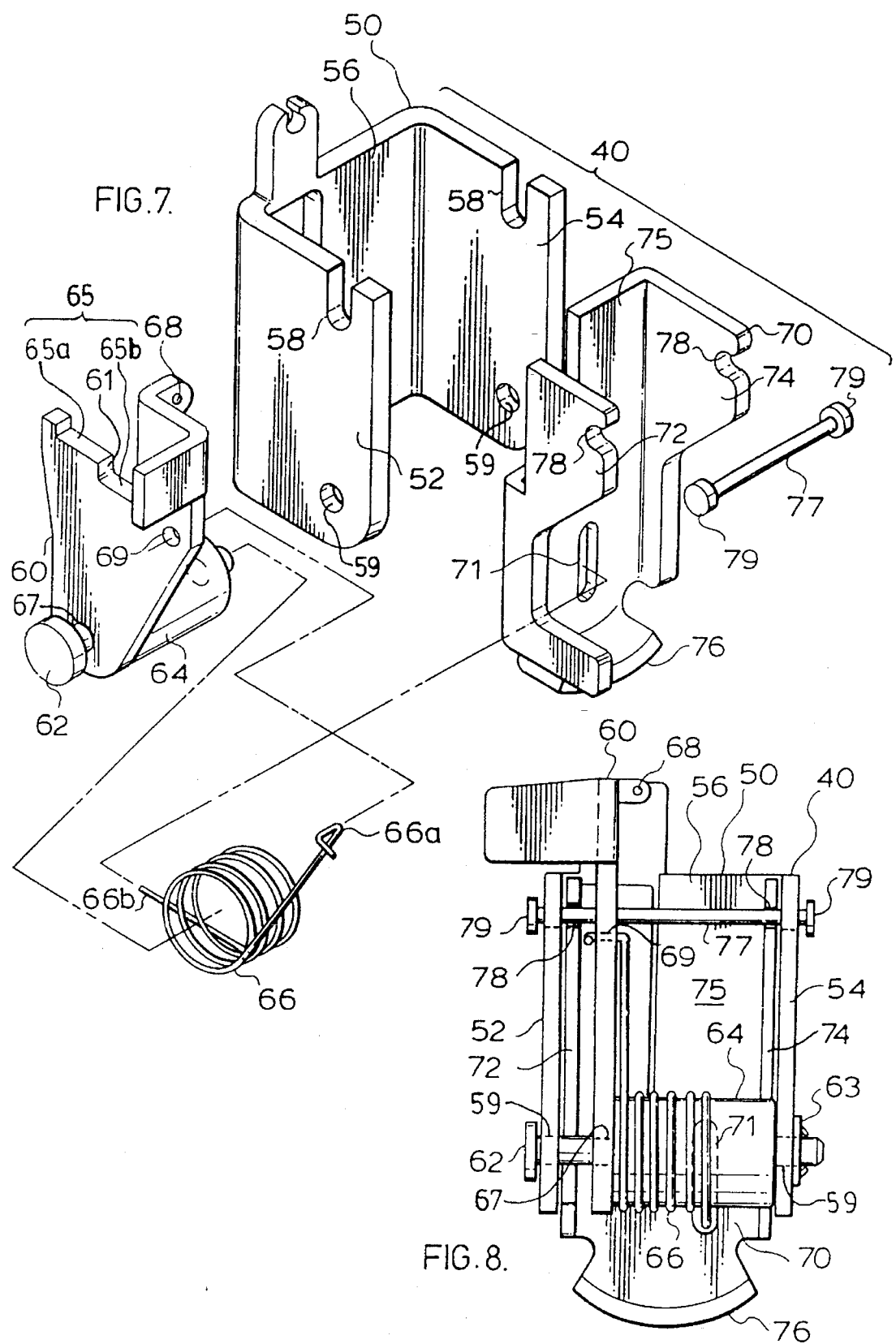

VEHICLE SEAT TRACK ASSEMBLY

FIELD OF THE INVENTION

This invention relates to vehicle seat track assemblies for vehicle seats and more particularly to seat track assemblies that provide for a vehicle seat to be readily returnable to its originating position in relation to the floor of the vehicle after the vehicle seat has been moved forwardly.

BACKGROUND OF THE INVENTION

Modern automobiles have front seats that are adjustable in terms of fore and aft positioning in order to provide adjustability for leg room of the front seat passengers or the rear seat passengers, and/or to accommodate cargo placement in or removal from the area behind the front seats of the vehicle. The seat track assemblies associated with these vehicle seats typically comprise two track members that are slidably engaged with each other. The two track members are locked together by the seat track locking means at a selected one of a number of available discreet locking positions, thereby to lock the vehicle seat in place at an adjusted position relative to the vehicle floor.

In most two-door vehicles, the seat back member of the front seats are also adapted so as to be forwardly tiltable relative to the seat cushion members, commonly referred to in the industry as "dumping", of the seatback member, so as to allow for ingress and egress of passengers and cargo into and out of the rear seat area. In smaller two-door vehicles, it may also be desirable to unlock the seat track assembly at the same time as the seatback is dumped, so that the vehicle seat (in its entirety) may be slid forwardly thus providing more room for ingress and egress of passenger or packages to the rear seat area. Such forward motion of the vehicle seat may be under urging by the user, or, more commonly, under urging by a spring means associated with the seat track assembly which biases the vehicle seat to its forward-most sliding position. Such forward motion of the vehicle seat upon dumping of the seat back member is commonly referred to in the industry as an "easy entry" feature.

Simple seat track assemblies having an easy entry feature, as just described, will not cause the locking means on the seat track assembly to become re-engaged at any particular point along the track assembly upon return travel of the vehicle seat. Rather, the person operating the track locking means by way of a handle member, must, after utilizing the easy entry feature, manually move the vehicle seat to the originating position, whereat the handle member is released so as to allow the track locking means to return to its locking configuration, thereby to secure the vehicle seat in this position. It may take several adjustment attempts by the seat occupant to accurately adjust the vehicle seat to its originating position. This is not only inconvenient to the person but frustrating and time consuming. To overcome this problem, so-called "memory devices" have recently been incorporated into seat track assemblies having the easy entry feature, which devices cause the locking means to be automatically reactivated during return sliding motion of the vehicle seat at or very near its originating position. This precludes the need for further re-adjustment of the fore/aft positioning of the vehicle seat. Such memory devices not only prevent frustration or annoyance, typically to the front seat occupant, but prevent annoyance to an occupant of the rear seat whose feet or legs might be hit by the seat returning to its extreme aft position upon re-adjustment by the front seat occupant.

U.S. Pat. No. 4,881,774 (Bradley et al.), shows a prior art seat track assembly having both the easy entry and memory device features, and is hereby incorporated by reference. The memory seat track assembly disclosed in U.S. Pat. No. 4,881,774 is heavy and complicated, consisting of a large number of interacting parts that are difficult to produce and assemble. These interacting parts of this seat track assembly must be manufactured to very close tolerances in order for these parts to fit together in proper functional relation, so as to allow for operative correct interconnection thereof. This prior art device is, therefore, relatively costly to manufacture. Moreover, the complicated and very diverse nature of prior art seat track assemblies having a memory feature, including the device shown in U.S. Pat. No. 4,881,774, means that they are not modular in design. Resultingly, the individual parts must be designed and retooled for production where the size of the vehicle seat used necessitates a different seat track size. Such re-design and re-tooling for specific new vehicle applications is extremely expensive and time-consuming.

It is, therefore an object of the present invention to provide an actuating device for controlling movement of a vehicle seat track locking device between locking and unlocking configurations, so as to cause a vehicle seat to be locked in place at a particular design position before the vehicle seat returns to its extreme aft position, when the vehicle seat is being moved rearwardly from a forward position after the seatback member has been "dumped" and returned to a normal upright position.

It is a further object of the present invention to provide an actuating device for selectively causing the locking and unlocking of a vehicle seat track locking device as aforesaid, which device is both simple and inexpensive to manufacture and to assemble, when compared to existing prior art devices having the same functionality.

It is another object of the present invention to provide an actuating device for selectively causing the locking and unlocking of a vehicle seat track locking device as aforesaid, which device is of sufficiently small size that it can be readily adapted for use in applications where space is at a premium.

It is yet another object of the present invention to provide an actuating device for selectively causing the locking and unlocking of a vehicle seat track locking device as aforesaid, which device is modular in nature, in the sense that it can be operatively fitted to vehicle seat track assemblies of varying lengths or widths for use with vehicle seats of various size, without any significant changes in the design or sizing of the component parts of the actuating device or the tooling utilized in the production of such parts.

It is yet another object of the present invention to provide an actuating device for selectively causing the locking and unlocking of a vehicle seat track locking device as aforesaid, which device is modular in nature, in the sense that need of special tools or jigs, and which does not require that the parts thereof be manufactured to close tolerances.

It is still another advantage of the present invention to provide an actuating device for selectively causing the locking and unlocking of a vehicle seat locking device as aforesaid, is lighter in weight than known prior art devices in the interests of energy conservation.

SUMMARY OF THE INVENTION

In accordance with the present invention there is provided, a vehicle seat track assembly for use with a vehicle seat having a seat cushion member and a seat back member pivotally movable over the seat cushion member from a first relatively upright position to a second relatively folded position. The vehicle seat track assembly of the present invention comprises a first track member adapted for being securely mounted on a vehicle; a second track member for being securely affixed to the seat cushion member and being slidably mounted on the first track member; a track locking means mounted on one of the first and second track members and movable between a locking configuration wherein the track locking means physically engages the other of the track members so as to thereby lock the second track member in position with respect to the first track member in a selected one of a plurality of relative locking positions, and an unlocking configuration wherein the track locking means is disengaged from the other of the track members so as to thereby permit relative sliding movement of the second track member with respect to the first track member, wherein the track locking means is biased toward the locking configuration; and, an actuating device for controlling movement of said track locking means between said locking and said unlocking configurations. The actuating device of the present invention comprises a frame member securely attached to a selected one of the first and second track members. An arm member is movably mounted on the frame member in operative engagement with the track locking means for movement between a rest position, at which rest position the arm member is positioned to permit the track locking means to assume the locking configuration, and a cocked position, at which cocked position the arm member restrains the track locking member in the unlocking configuration. A first biasing means acts on the arm member to bias the arm member to the rest position. A link means is adapted for operative interconnection between the seat back member and the arm member to selectively move the arm member from its rest position to its cocked position against the action of the first biasing means, upon the pivotal movement of the seat back member from its first relatively upright position to its second relatively folded position. A cam follower means is movably mounted on the frame member so as to be in progressive operative contact with the arm member for movement between a first position corresponding with the rest position of the arm member and a second position corresponding with the cocked position of the arm member, at which second position the cam follower means restrainingly engages the arm member to hold fast the arm member in the cocked position against the spring biasing of the arm member, independently of the action of the link means. A cam member is securely attached to the other of the first and second track members at a predetermined position along the other track member, the cam member being dimensioned and otherwise adapted to contact the cam follower means in its second position upon movement of the cam follower means therepast, thereby to urge the cam follower means to move from its the second position to its the first position so as to permit release of the arm member from the cocked position, as aforesaid.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter of which is briefly described hereinbelow.

BRIEF DESCRIPTION OF THE DRAWINGS

FIG. 1 is an isometric view from the front left of a vehicle seat, with the seatback member thereof in a relatively upright position, and having the actuating device of the present invention installed on the associated seat track assembly;

FIG. 2 is a side elevational view from the left of the vehicle seat of FIG. 1, with the top portion of the seatback member cut-away, and with the seatback member folded forwardly;

FIG. 4 is a side elevational view of the vehicle seat of FIG. 1 with the seatback member again in an upright position and with the vehicle seat track locked at a predetermined set position, as caused by the actuating device of the present invention;

FIG. 5 is an isometric view of the seat track assembly and the actuating device of FIG. 1, with the seat track assembly in its locking configuration;

FIG. 6 is a sectional elevational view along sight lines 6—6 of FIG. 5;

FIG. 7 is an exploded isometric view on an enlarged scale, of the actuating device of FIG. 1;

FIG. 8 is a front elevational view of the actuating device of FIG. 7;

FIG. 10 is an isometric view of the actuating device of FIGS. 7 and 8 in its cocked position;

FIG. 11 is an isometric view of the actuating device of FIG. 7 and 8 in its rest position;

DETAILED DESCRIPTION OF A PREFERRED EMBODIMENT

Figure 3:
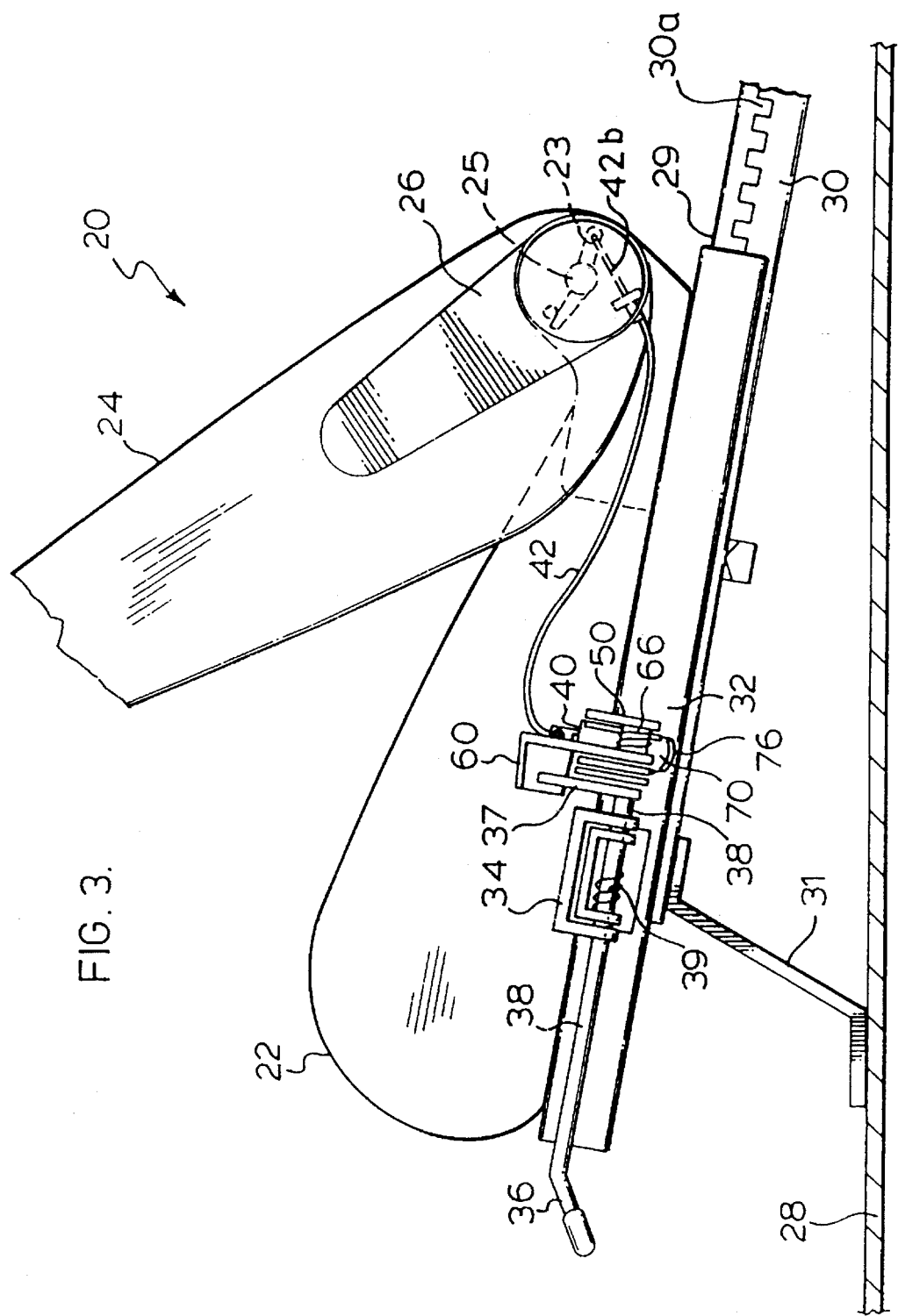
FIG. 3 is a side elevational view from the left of the vehicle seat of FIG. 1, with the top portion of the seatback member cut-away, and with the seatback member folded forwardly, and with the vehicle seat moved forwardly to allow for the ingress and egress of passengers into and out of the rear seat area.

Reference will now be made to FIGS. 1–4, which show the basic use of the actuating device 40 of the present invention, installed on a vehicle seat, indicated by the general reference numeral 20. The vehicle seat 20 is a bucket-type seat having a seat cushion member 22 and a seatback member 24 that is connected to the seat cushion member 22 by a seat hinge member 26, so as to be pivotally moveable about pivot axis 25 over the seat cushion member 22. The seatback member 24 is pivotally moveable from a first relatively upright position, as shown in FIGS. 1 and 4, to a second relatively folded position, as shown in FIGS. 2 and 3. The vehicle seat 20 is installed in a vehicle (not shown) by way of leg members 31 that are secured to the floor 28 of the vehicle by known fastening means such as bolts (not shown). The vehicle seat 20 is retained in forward and rearward slidable moving relation within the vehicle by way of a vehicle seat track assembly 29, which comprises a first track member 30 and a second track member 32. The first track member 30 is fixed to the floor 28 of the vehicle by the leg members 31. The second track member 32 is securely mounted in a conventional manner on the seat cushion member 22 and is slidably mounted on the first track member 30 with the aid of entrapped ball bearings 33, which slidable mounting is well known in the prior art.

A track locking means 34 is mounted, as shown, on the second track member 32, by way of a bracket member 41, which bracket member 41 is fastened to the second track member 32 by way of conventional fastening means (not shown). The track locking means 34 is generally similar to that shown in co-pending Canadian patent application Ser. No. 2,074,205, filed Jul. 20, 1992, and owned by the present applicant, and has a handle member 36 extending therefrom, which handle member 36 is hand operated by the occupant of the vehicle seat 20 in order to engage and disengage the first 30 and second 32 track members with respect to each other.

The track locking means 34 may also be mounted upon the first track member 30. However, this would normally not be done, since the handle member 36 would not move forwardly and rearwardly as the vehicle seat 20 moves forwardly and rearwardly, thus making the handle member 36 potentially more inconvenient to access.

Figure 13:
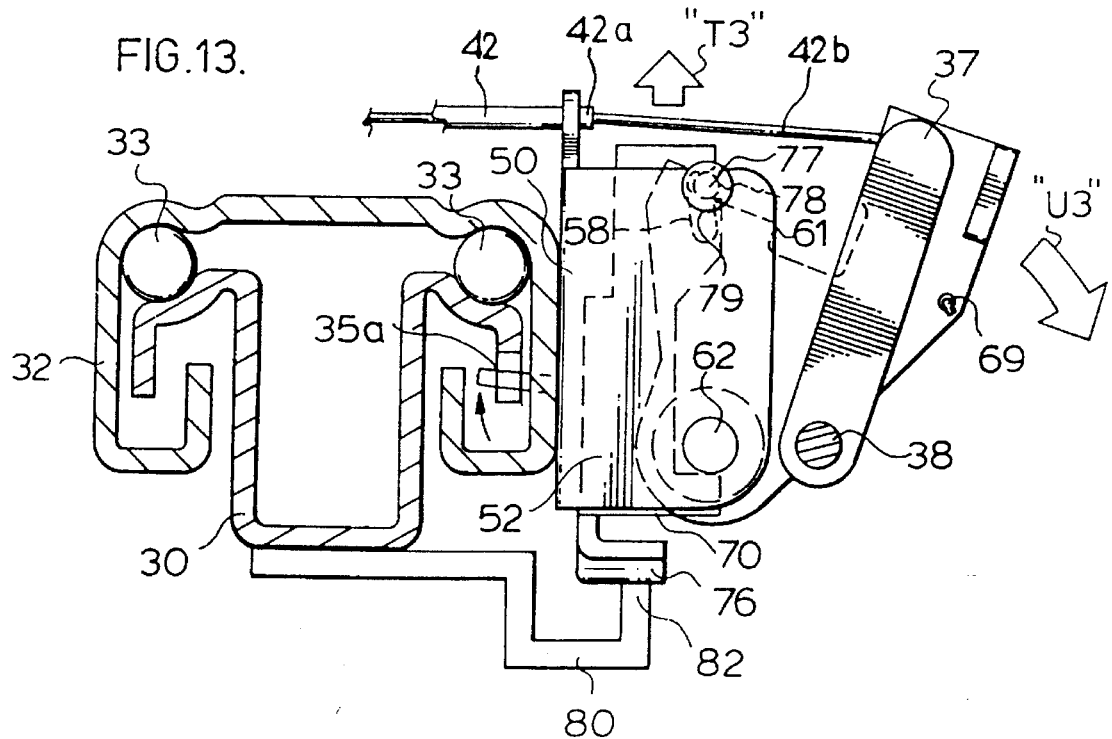

The track locking means 34 has a locking member 35 with a plurality of detent portions 35a thereon. The locking member 35 is securely mounted on the shaft member 38 for rotational movement in conjunction therewith, by way of the handle member 36, between a locking configuration and an unlocking configuration. A biasing spring 39 is operatively mounted so as to be interconnected between the bracket member 41 and the locking member 35, so as to bias the locking member 35 to its locking configuration. Preferably, the track locking means 34 is biased towards its locking configuration so as to keep the first 30 and second 32 track members locked with respect to one another at virtually all times, unless specifically released by a person operating the handle member 36. In the locking configuration (as best seen in FIGS. 6 and 13), the detent portions 35a of the locking member 35 physically engage the teeth 30a of the first track member 30 so as to thereby lock the first 30 and second 32 track members with respect to each other. In the unlocking configuration, (as best seen in FIG. 13), the detent portions 35a of the locking member 35 no longer physically engage the teeth 30a of the first track member 30, so as to thereby unlock the first 30 and second 32 track members with respect to each other.

In the preferred embodiment shown, the second track member is lockable in position with respect to the first track member 30 in a selected one of a plurality of relative locking positions, which locking positions correspond to a plurality of forwardly and rearwardly disposed positions of the vehicle seat 20. In its unlocking configuration, the track locking means 34 is disengaged from the other one of the first 30 and second 32 track members, in this case from the first track member 30, so as to thereby permit relative sliding movement of the second track member 32 with respect to the first track member 30.

As can be seen in each of the FIGS. 1–4, the actuating device 40 of the present invention is secured to the first 30 and second 32 track members and is used to control movement of the track locking means 34 between its locking and unlocking configurations, as will be described hereinafter in greater detail.

In FIG. 1, the seatback member 24 of the vehicle seat 20 is in its relatively upright "design" position with respect to the seat cushion member 22. This design position of the seatback member 24 is the position that is normally used when an "average" occupant is sitting in the vehicle seat 20.

Further, the vehicle seat 20 is typically located in a reasonably rearwardly disposed position along the vehicle seat track assembly 29, so as to give the occupant of the vehicle seat 20 sufficient leg room. In most instances involving two door vehicles, in order for a person to ingress into or egress out of the rear seat area behind the vehicle seat 20, it is necessary to pivot the seatback member 24 to its second relatively folded position over the seat cushion member 22, as indicated by arrow "A" in FIG. 2. Further, it is preferable with smaller two door vehicles, to also slide the vehicle seat 20 forwardly, as indicated by arrow "B" in FIG. 2, such that the second track member 32 slides forwardly with respect to the first track member 30. A lever member 23 is mounted for rotation about the pivot axis 25 of the seat hinge member 26 for rotation coincident with forward folding of the seatback member 24. A link means 42 comprising an inner metal cable 42b and an outer sheath 42a of protective material, is attached to the lever member 23, in secured operative relation. The inner cable 42b is operatively secured at its other end to a portion of the actuating device 40. Thus, when the seatback member 24 is pivoted to its second relatively folded position, as shown by arrow "A" of FIG. 2, the lever member 23 pulls on the inner cable 42b. The inner cable 42b in turn pulls on the actuating device 40, as more fully described below, so as to release the track locking means 34, and thereby allow the vehicle seat 20 to be slidably moved forwardly (either manually or, preferably, automatically under urging by a biasing spring, not shown), in the direction indicated by arrow "B" to a forward position as shown in FIG. 3. The actuation member holds the track locking means 34 in its unlocked configuration until released in a manner described below.

To return the vehicle seat 20 from an extreme forward position, as shown in FIG. 3, to a more rearward position suitable for an occupant to sit in, the seatback member 24 must first be pivoted to its design position, as shown by arrow "C" in FIG. 4, and then the vehicle seat 20 must be slidably moved along the vehicle seat track assembly 29, until the actuating device 40 is tripped by the action of a cam member 80 securely mounted on the first track member 30, so as to release the track locking means 34 at the set position of the cam member, thereby to lock the second track member 32 in position with respect to the first track member 30 at said set position. The set position of the cam member 80 is determined for each vehicle application, and is easily altered by simply changing the location of the cam member 80, as will be described more fully below.

As will be appreciated from FIG. 5, the normal fore and aft position of the vehicle seat 20 may be adjusted independently of the actuating device 40. In order to manually disengage the track locking means 34 from the fixed first track member 30, so as to allow forward sliding movement, as indicated by arrow "E", or rearward sliding movement, as indicated by arrow "F", of the second track member 32 with respect to the first track member 30, the handle member 36 is lifted upwardly so as to rotate the mounting shaft member 38 in the direction indicated by arrow "G". When the handle member 36 is released, the shaft member 38 is caused to rotate in the direction as shown by arrow "H", as caused by a biasing spring 39, so as to again return the track locking means 34 into physically engagement with the first track member 30 as previously described, thus locking the first 30 and second 32 track members in position with respect to each other. This seat track lock is disclosed in its entirety in co-pending Canadian patent application Ser. No. 2,074,205 of the same applicant.

Reference will now be made to FIGS. 5–8, to more fully describe the actuating device 40 of the present invention. A frame member 50 that is substantially "U" shaped in cross-section with a first arm portion 52, a second arm portion 54, and a connecting portion 56, is securely attached to the second 32 track members. In the embodiment shown, the frame member 50 is disposed externally to the vehicle seat track assembly 29. The frame member 50 is securely fastened to the second frame member 32 by way of conventional fastening means, such as welding or mounting bolts (not shown). In this manner, frame member 50, and therefore the actuating device 40, are positioned juxtaposed to the track locking means 34, and both the track locking means 34 and the actuating device 40 slidingly move in conjunction with the seat cushion member 22.

Figure 9A:
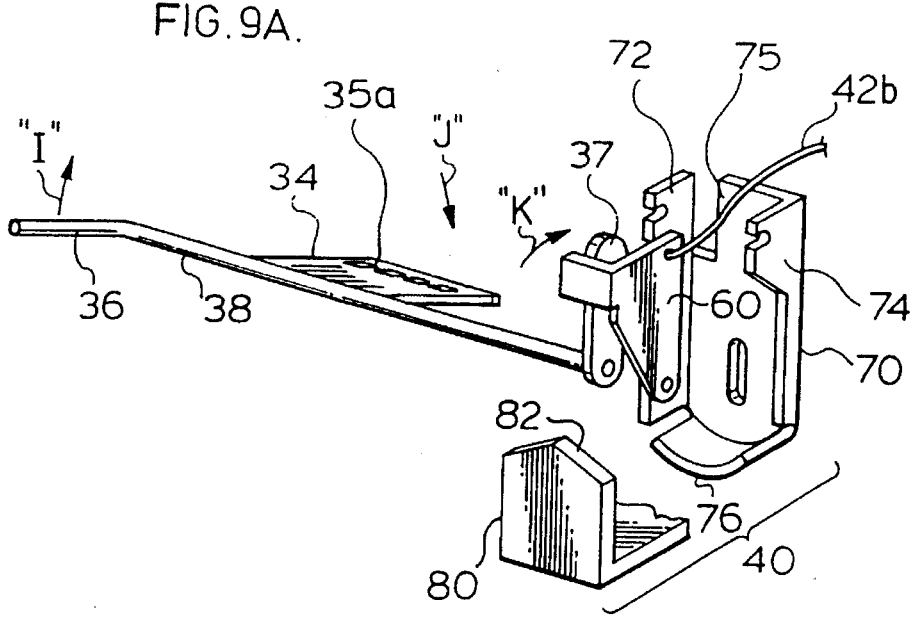
FIGS. 9A through 9D are isometric diagrammatic views of selected working parts of the actuating device and of the seat track assembly of the vehicle seat of FIG. 1.
Figure 9B:
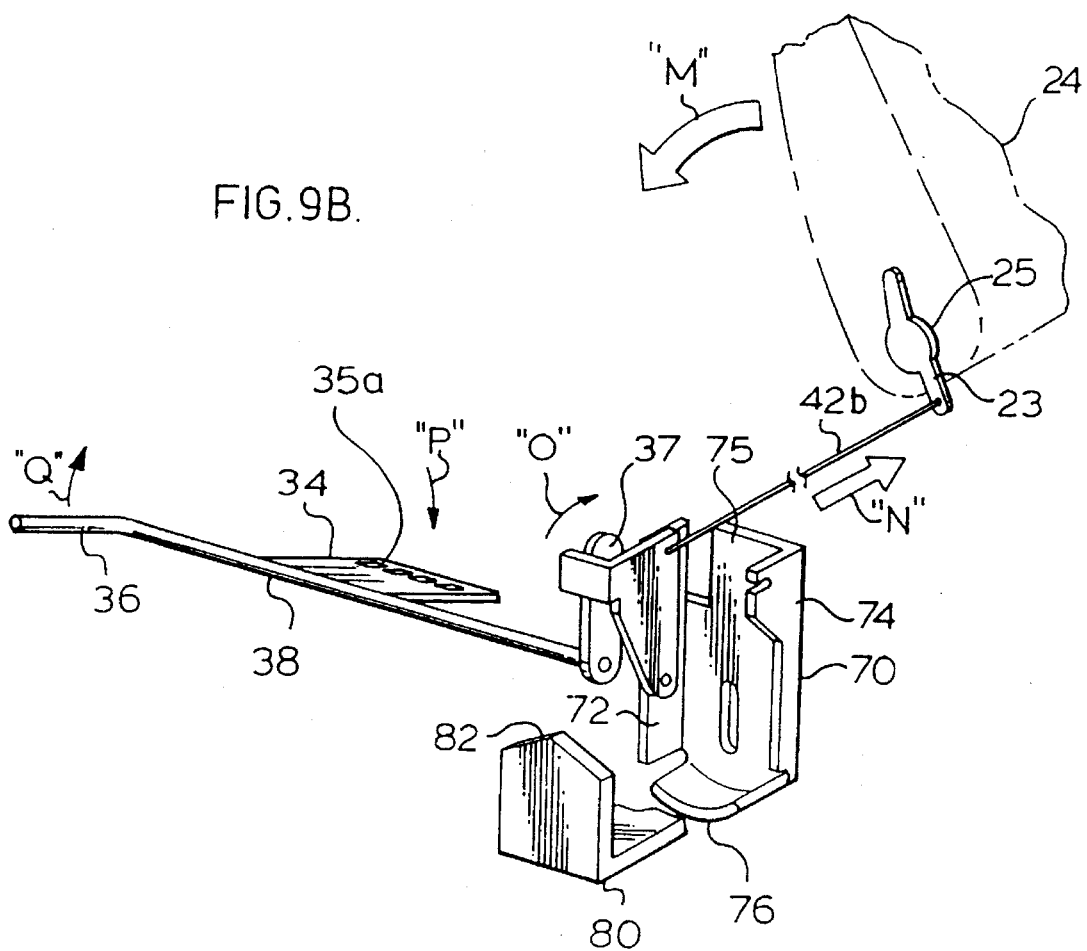

An arm member 60 is movably mounted in rotatable relation on the frame member 50 by way of a pin 62, which pin 62 passes through an aperture 67 in the arm member 60 and through an aligned pair of apertures 59,59 in the arms 52,54 of the frame member 50. A bushing 64 mounted on the pin 62 mounted on the pin 62 holds the arm member 60 in operative spaced relation between the first 52 and second 54 arm members, as shown, and the pin 62 is securely retained within the apertures 59,59 by a conventional locking clip 63, positioned at one end. The arm member 60 is in this manner rotatably mounted for movement between a rest position (as shown in FIG. 9A) and a cocked position (as shown in FIG. 9B) and is moved from its rest position to its cocked position by the aforesaid pulling action of the inner cable 42b. As can be seen in FIG. 10, the outer sheath 42a of the link means 42 is held in clamped relation by an upstanding ear 44 of the frame member 50 and the inner cable member 42b of the link means 42 is operatively engaged in a conventional manner within a first aperture 68 in the arm member 60. The arm member 60 is in operative engagement with the track locking means 34 by way of a mating link member 37, rigidly mounted on the shaft member 38 for rotation therewith. When the arm member 60 is at its rest position (see FIGS. 5, 9A, 11 and 13), it is positioned to permit the track locking mechanism to assume its locking configuration. When the arm member 60 is in its cocked position, (see FIG. 9B and 10) the arm member 60 pulls on the mating link member 37, so as to rotate the shaft 38 in the direction of arrow "G" of FIG. 5, and thereby restrain the track locking member 34 in its unlocking configuration, thereby allowing for relative sliding movement of the first 30 and second 32 track members with respect to each other. Resultingly, the vehicle seat 20 may be moved forwardly in the direction of arrow "B" of FIG. 2, as desired.

A cam follower means 70 is movably mounted within the frame member 50 in slidable relation thereto. In the preferred embodiment illustrated, the cam follower means is spring biased by a second biasing means, which is also in the form of the aforesaid spring member 66, to its second position. When the cam member 80 urges the cam follower means 70 to move from its second position to its first position, it is doing so against the biasing of the spring member 66.

The cam follower means 70 is substantially "U" shaped in cross-section to fit in sliding relation within the first 52 and second 54 arm portions of the frame member 50, and has a first arm portion 72, a second arm portion 74 and a connecting portion 75 that extends downwardly and terminates in a curved cam contacting surface 76. A discrete cross-bar member 77 (see especially FIGS. 7 and 8) is received in operative engagement within a pair of horizontally oriented receiving slots 78 in the cam follower means 70, and is further received in operative engagement within a pair of vertically oriented receiving slots 58 within the frame member 50, so as to be trapped within the first 78 and second 58 pair of receiving slots in the assembled actuation device 40. Further, the cross-bar member 77 has enlarged stop means 79 at each end thereof to preclude the cross-bar member 77 from axial withdrawal from the horizontal 78 and vertical 58 pairs of receiving slots.

Figure 12:
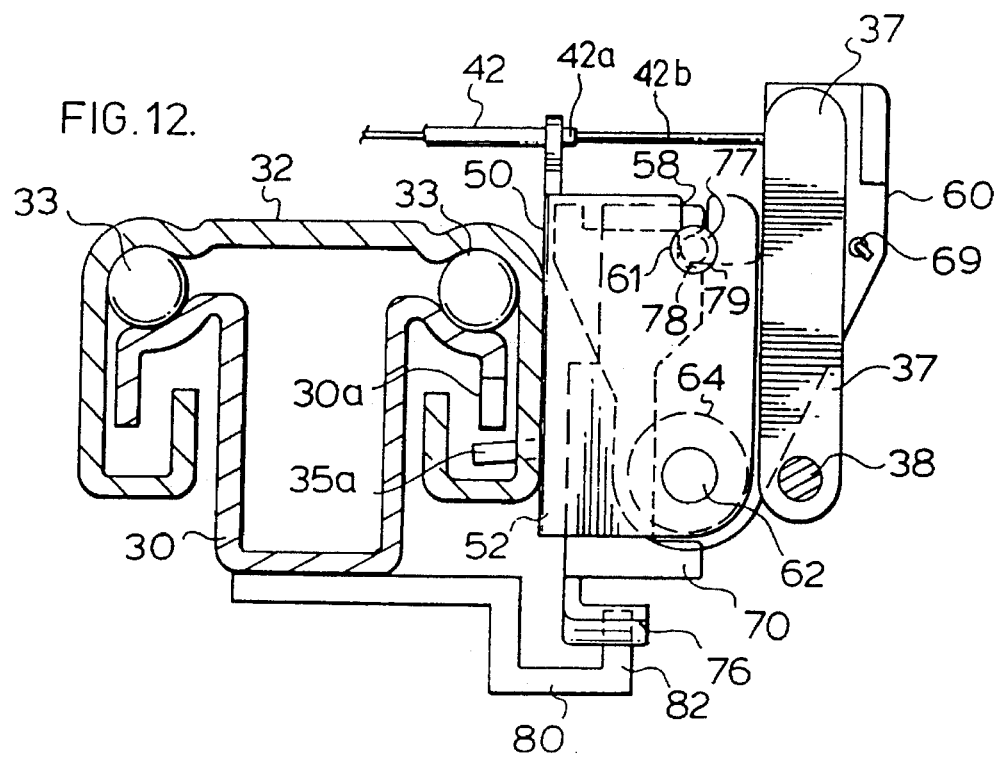
FIG. 12 is a side elevational view, partly in phantom, of the actuating device of FIG. 1, showing the vehicle seat track assembly in section, with the actuating device in its cocked position; and, FIG. 13 is a view similar to FIG. 12, with the actuating device in its released position.

The cam follower means 70 moves between a first position, which, in the preferred embodiment illustrated, is a raised position, and a second position, which in the preferred embodiment is a lowered position. The raised first position corresponds with the rest position of the arm member 60, and can best be seen in FIGS. 11 and 13. The lowered second position corresponds with the cocked position of the arm member 60, and can best be seen in FIGS. 10 and 12. At its raised first position, the cam follower means 70 restrainingly engages the arm member 60 against the biasing force of the biasing spring member 66, in its rest position by way of restraining contact between the raised finger 46 of arm member 60 and the cross-bar member 77 (see FIG. 11) of the cam follower means 70. The cam follower means 70 is biased downwardly so as to cause the cross-bar member 77 to be biased against a generally horizontally disposed receiving surface 65 on the arm member 60. The receiving surface 65 has an upper portion 65a and a lower portion 65b, which upper 65a and lower 65b portions are separated by a generally vertically disposed engaging portion 61. The cross-bar member 77 engaging the upper portion 65a corresponds to the cam follower means 70 being in its raised first position, and the cross-bar member 77 engaging the lower portion 65b corresponds to the cam follower means 70 being in its lowered second position. The arm member 60 is thereby precluded from travelling past its rest position.

When the arm member 60 is in its rest position, it is free to be readily moved to its cocked position, under the pulling action of the inner cable means 42b, by merely overcoming the biasing force of the spring member 66. As the inner cable 42b initially pulls on the arm member 60, the cross-bar member 77 rides along the upper portion 65a of a receiving surface 65, biased thereagainst by the spring member 66. When the arm member 60 has been moved through a portion of its travel between its rest position and its cocked position, the engaging portion 61 of the receiving surface 65 and the cross-bar member 77 pass each other. The cross-bar member 77 is forced downwardly by the action of the biasing spring member 66 along the engaging portion 61 of the receiving surface 65 until it reaches the lower portion 65b of the receiving surface 65. Once the cross-bar member 77 reaches the lower portion 65b of the receiving surface 65, and the cam follower means 70 is correspondingly in its lowered second position, the arm member 60 is considered to be in its cocked position. The arm member 60 may continue to be pulled on by the inner cable means 42b, which accommodates the full amount of forward tilting of the seatback member 24. At its lowered second position the cross-bar member 77 of the cam follower means 70 restrainingly engages the arm member 60 at the engaging portion 61 of the receiving surface 65, to hold fast the arm member 60 in its cocked position against the biasing force of the spring member 66.

The arm member 60 cannot be moved to its rest position until the cam follower means 70 is moved from its lowered position to its raised first position. The restraining engagement of the arm member 60 by the cam follower means 70 is independent of the action of the sheathed cable 42 that is attached to the seatback member 24, such that raising the seatback member 24 when the arm member 60 is so restrained by the cam follower means will have no effect on the actuation device 40.

A cam member 80 is securely attached to the first track member 30 at a predetermined position along the first track member 30, which position is established during the design and manufacture of the vehicle seat track assembly 29, for a particular vehicle type. The cam member 80 has a cam surface 82, and is thereby dimensioned and otherwise adapted to progressively contact the curved cam contacting surface 76 of the cam follower means 70 when the cam follower means 70 is in its second position upon movement of the cam follower means 70 therepast the cam surface 82 of the cam member 80. The term "therepast" is defined in the present application and claims to mean generally at or slightly past a point at which the extreme lower and upper portions of the curved cam contacting surface 76 and the cam surface 82 respectively, operatively contact each other. When the cam contacting surface 76 of the cam follower means 70 and the cam surface 82 of the cam member 80 operatively contact each other, the cam follower means 70 is urged to move from its lowered second position to its raised first position so as to thereby permit release of the arm member 60 from its cocked position to its rest position, which release has been previously described. In this manner, the arm member 60 is permitted to be released from its cocked position to its rest position, as aforesaid, when and only when the seatback member 24 is in a relatively upright position. Accordingly, the arm member 60 will not be released from its cocked position to its rest position when the cam follower means 70 is moved past the cam member 80, if the seatback member 24 is in its forwardly folded position. This is so as tension from the inner cable 42b will keep the arm member 60 substantially in its cocked position, even though the cam follower means 70 is caused to travel from its lowered second position to its raised first position as it moves over the cam member 80 with the seatback member 24 in the relatively folded position.

Reference will now be made to FIGS. 1–4 and 9A–13, which show the operation of the actuating device 40 of the present invention in conjunction with the vehicle seat 20 and vehicle seat track assembly 29. In FIG. 9A, the illustrated components are in the respective positions they would occupy when the vehicle seat 20 is in the design position of FIG. 1. The cam follower means 70 is in its raised first position, whereat the curved cam contacting surface 76 of the cam follower means 70 is in position to ride over the cam surface 82 of the cam member 80. The arm member 60 is in its rest position with the inner cable means 42a only slightly taut. It can be seen in FIG. 9A, that the handle member 36 may be moved in the direction of arrow "T" to release the track locking means 34, which track locking means 34 correspondingly moves in the direction of arrow "J" to its unlocking position. The mating link member 37 also rotates as indicated by arrow "K" corresponding to the movement of the handle member 36. It should be noted that the movement of the mating link member 37 does not cause corresponding movement of the arm member 60 and, in this manner, the normal operation of the track locking means 34 is not interfered with whatsoever by the actuating device 40 of the present invention.

Figure 9C:
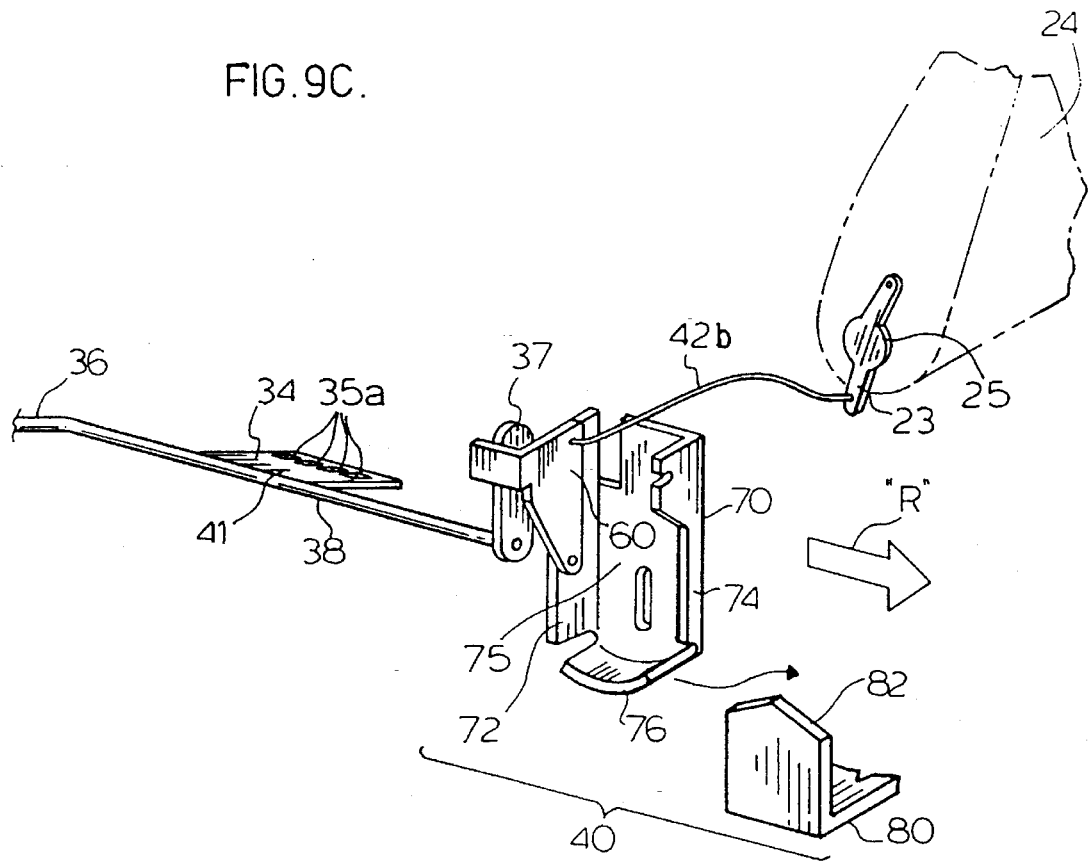

As can be seen in FIGS. 9C, and also in FIG. 2, when the seatback member 24 is moved from its relatively upright position to its relatively folded position, as indicated by arrow "M", the inner cable means 42b is pulled in the direction of arrow "N" to correspondingly rotate the arm member 60 in the direction of arrow "O". The arm member 60 pushes the mating arm member 37 also in the direction of arrow "O" so as to move the track locking means 34 from its locking position to its unlocking position, as shown by arrow "P". Correspondingly, the handle member 36 moves in the direction as shown by arrow "Q". As the arm member 60 is pulled from its rest position to its cocked position, the cross bar member 77 of the cam follower means 70 rides along the receiving surface 65. As the cross bar member 77 transitions from the upper portion 65a to the lower portion 65b, the cam follower means 70 moves from its raised first position to its lowered second position. Subsequently, the vehicle seat 20 is pushed forwardly so as to move the cam follower means 70 forwardly over the cam surface 82 of the cam member 80, thus temporarily moving the cam follower means 70 from its lowered second position to its raised first position, and then back to its lowered second position by the spring member 66, after the cam follower means 70 passed the cam member 80.

Figure 9D:
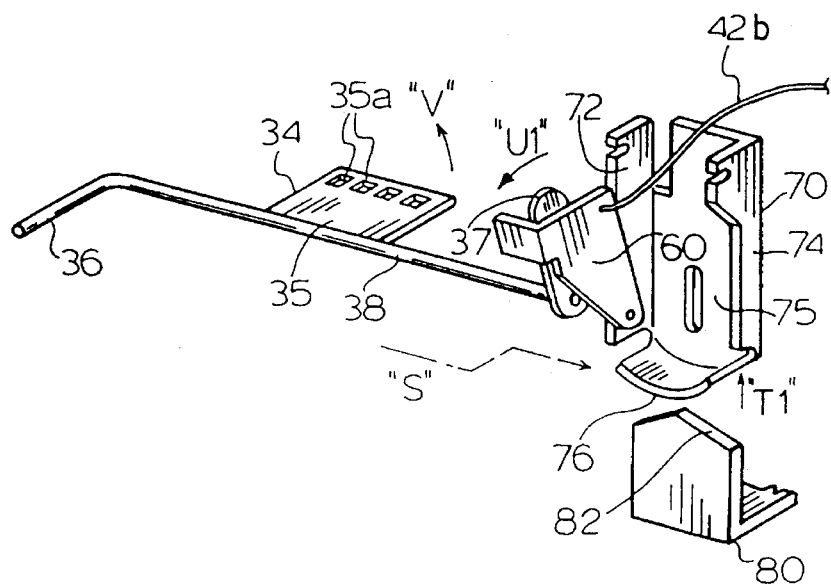
Figure 9C:
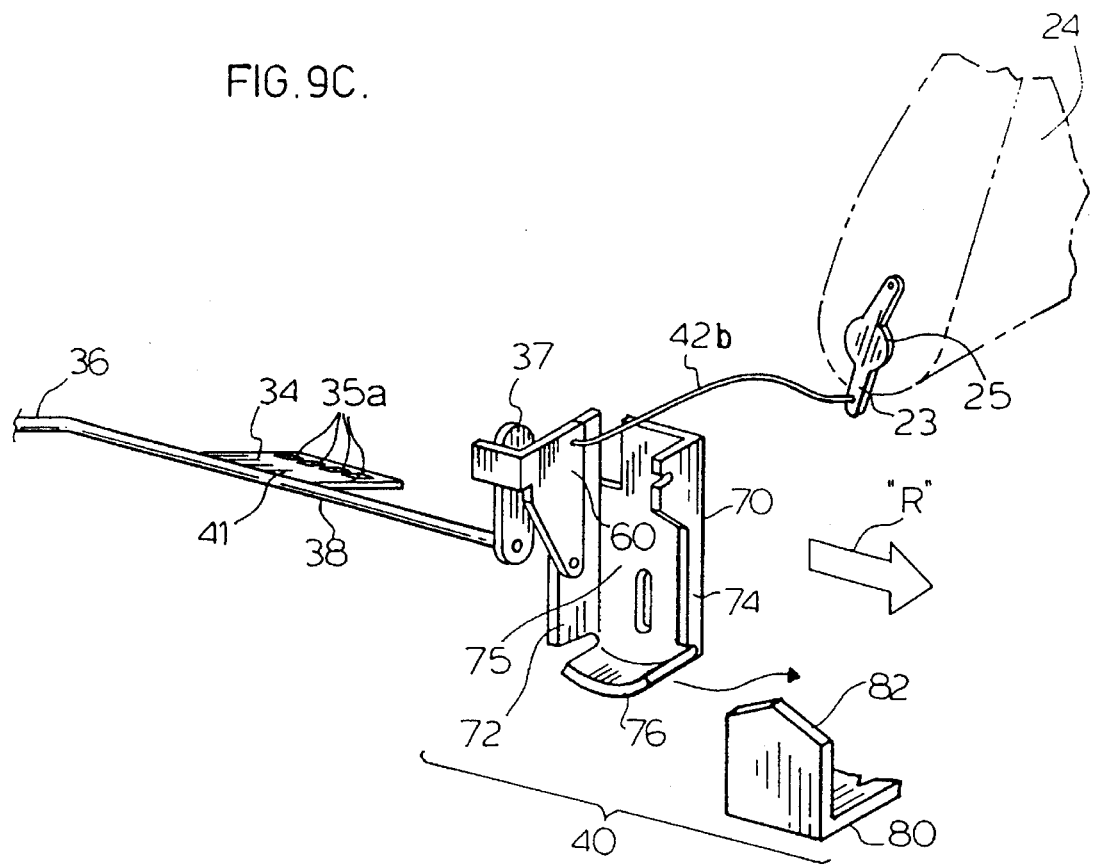
Figure 9D:
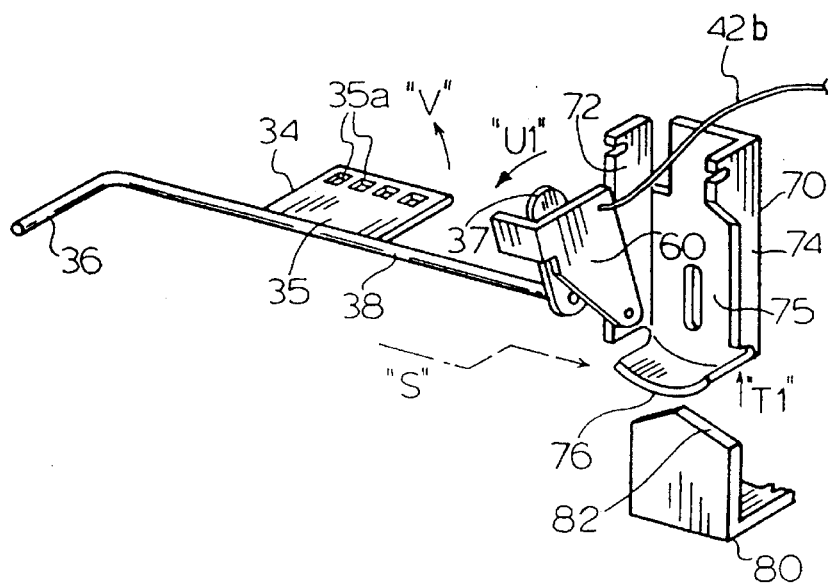

As can be seen in FIGS. 3 and 9C, after a person has ingressed into or egressed from the rear seat area, the vehicle seat 20 may be returned towards the rear of the vehicle for an occupant to sit therein, as shown by arrow "R" in FIG. 3. The relative positioning of the components as shown in FIG. 9C can be seen in complete detail in FIG. 10. The seatback member 24 must first be returned to its design position. Once the seatback member 24 has been returned to its design position, the inner cable means 42b is no longer taut, and therefore cannot hold the arm member in its cocked position. As can be seen in FIG. 10, the arm member is at this time held in its cocked position, however, by the cam follower means 70. The cross-bar member 77 on the cam follower means 70 engages the engaging portion 61 of the receiving surface 65 on the arm member 60. Correspondingly, the arm member 60 holds the track locking means 34 in its unlocking configuration. As the vehicle seat 20 is returned toward the rear of the vehicle, as discussed previously, the curved cam contacting surface 76 of the cam follower means 70 approaches the cam surface 82 of the cam member 80. In FIG. 9D, the cam follower means 70 has reached the cam member 80, such that the curved cam contacting surface 76 of the cam follower means 70 engages the cam surface 82 of the cam member 80, as indicated by arrow "S". Resultingly, the cam follower means 70 is moved from its lowered second position to its raised first position, as indicated by arrow "T1" in FIG. 9D and by arrow "T2" in FIG. 11. The cross-bar member 77 of the cam follower means 70 no longer abuts against the engaging portion 61 of the receiving surface 65 on the arm member 60, as can be seen in FIG. 11. The arm member 60 is moved from its cocked position to its released position by the spring member 66, as shown in FIGS. 9D and 11, in a direction indicated by arrow "U1" in FIG. 9D and arrow "U2" in FIG. 11. Correspondingly, the mating link member 37 is allowed to rotate with the arm member 60, thus permitting the track locking means 34 to rotate upwardly, as indicated by arrow "V" in FIG. 9D, to its locking configuration, thus causing the first 30 and second 32 track members to be locked in position with respect to each other. The vehicle seat 20 is thereby stopped at this set position. Resultingly, the position that the vehicle seat 20 is automatically returned to is determined by the positioning of the cam member 80 on the first track member 30.

It will be understood that numerous variations as will occur to those skilled in the art may be made to the above-described apparatus without departing from the claimed scope of the invention. For example, in one alternative embodiment, it is contemplated that the frame member 50, and therefore the actuating device 40, may be securely attached to the first track member 30, with the track locking means 34 being securely attached to the first track member 30, or even the second track member 32, depending on the exact engineering design of the overall mechanisms.

In a further alternative embodiment, it is contemplated that the cam member 80 be securely attached in movable relation to the first track member so as to be positionable at any of a plurality of selectable positions along the first track member 30. The selectable positions would initially be selected by the manufacturer of the vehicle seat, and could subsequently be selected by the operator of the vehicle.

In another alternative embodiment of the present invention, it is contemplated that the arm member 60 be configured such that the cam follower means 70 is moved from its raised first position to its lowered second position by the arm member 60 (by way of an appropriately configured cam surface on the arm member 60), with the position of the cam follower means 70 being directly and specifically determined by the position of the arm member 60. Resultingly, the cam follower means 70 cannot be raised by the cam member 80 from its lowered second position to its raised first position without attempting to cause the arm member 60 from being moved from its cocked position to its rest position. If the seatback member 24 is still in is forwardly folded position, which means that the arm member 60 cannot be moved from its cocked position to its rest position, the cam follower means 70 cannot move from its lowered second position to its raised first position, and thus the vehicle seat 20 cannot be moved past the set position, even though the seat back member 24 has not been returned to its relatively upright position.

I claim:

1. A vehicle seat track assembly for use with a vehicle seat having a seat cushion member and a seat back member pivotally movable over said seat cushion member from a first relatively upright position to a second relatively folded position said vehicle seat track assembly comprising:

a first track member adapted for being securely mounted on a vehicle;

a second track member for being securely affixed to said seat cushion member and being slidably mounted on said first track member;

a track locking means mounted on one of said first and second track members and movable between a locking configuration wherein said track locking means physically engages the other of said track members so as to thereby lock the second track member in position with respect to the first track member in a selected one of a plurality of relative locking positions, and an unlocking configuration wherein said track locking means is disengaged from said other of said track members so as to thereby permit relative sliding movement of said second track member with respect to said first track member, wherein said track locking means is biased toward said locking configuration; and, an actuating device for controlling movement of said track locking means between said locking and said unlocking configurations, said actuating device comprising:

a frame member securely attached to a selected one of said first and second track members;

an arm member movably mounted on the frame member in operative engagement with said track locking means for movement between a rest position, at which rest position said arm member is positioned to permit said track locking means to assume said locking configuration, and a cocked position, at which cocked position said arm member restrains said track locking means in said unlocking configuration;

first biasing means acting on the arm member to bias the arm member to said rest position;

link means for operative interconnection between said seat back member and the arm member to selectively move said arm member from its rest position to its cocked position against the action of said first biasing means upon said pivotal movement of the seat back member from its first relatively upright position to its second relatively folded position;

a cam follower means movably mounted on said frame member so as to be in progressive operative contact with said arm member for movement between a first position corresponding with the rest position of the arm member and a second position corresponding with the cocked position of the arm member, at which second position the cam follower means restrainingly engages the arm member to hold fast said arm member in said cocked position against the spring biasing of said arm member, independently of the action of the link means; and, a cam member securely attached to the other of said first and second track members at a predetermined position along said other track member, said cam member being dimensioned and otherwise adapted to contact said cam follower means in its second position upon movement of said cam follower means therepast, thereby to urge said cam follower means to move from its said second position to its said first position so as to permit release of said arm member from the cocked position as aforesaid.

2. The vehicle seat track assembly of claim 1, wherein said track locking means is mounted on said selected one of said first and second track members.

3. The vehicle seat track assembly of claim 2, wherein said predetermined position of said cam member along said other track member is set during assembly of said vehicle seat track assembly having said actuating device mounted thereon.

4. The vehicle seat track assembly of claim 2, wherein said cam member is securely attached in movable relation to the other of said first and second track members so as to be positionable at any of a plurality of selectable positions along said other track member.

5. The vehicle seat track assembly of claim 4 further comprising second biasing means acting on the cam follower means to bias the cam follower means toward its said second position.

6. The vehicle seat track assembly of claim 5, wherein said cam member urges said cam follower means to move from its said second position to its said first position against the biasing of said second biasing means so as to permit release of said arm member from the cocked position as aforesaid, when and only when said seat back member is in said relatively upright position.

7. The vehicle seat track assembly of claim 6, wherein said cam follower means is movably mounted on said frame member in slidable relation thereto.

8. The vehicle seat track assembly of claim 7, wherein said arm member is movably mounted on said frame member in rotatable relation thereto.

9. The vehicle seat track assembly of claim 8, wherein said arm member limits the travel of said cam follower means in a direction from said first position toward said second position, as biased by said second biasing means, at said second position.

10. The vehicle seat track assembly of claim 9, wherein said frame member is substantially "U"-shaped in cross-section and said cam follower means is slidably engaged within the arms defined by said "U"-shaped frame member.

11. The vehicle seat track assembly of claim 10, wherein said cam follower means is substantially "U"-shaped in cross-section and has a discrete cross-bar member held between the open arms defined by said "U"-shaped cam follower means, and said cross-bar member is adapted to be in said progressive operative contact with said arm member.

12. The vehicle seat track assembly of claim 11, wherein said cam follower means has a first pair of receiving slots therein and said frame member has a second pair of receiving slots therein, said first and second pairs of receiving slots being adapted to receive said cross-bar member in operative engagement therein, and, further, wherein said cross-bar member has enlarged stop means at each of its free ends thereby to preclude axial withdrawal of said cross-bar member from said first and second pairs of receiving slots.

13. The vehicle seat track assembly of claim 12, wherein said link means comprises a sheathed cable securely attached at one end thereof to said arm member and adapted for secure attachment at the other end thereof to said seat back member, so as to thereby move said arm member from said first position to said second position when said seat back member is tilted forwardly over said seat cushion member.

* * * * *